United States Patent [19]

Kurihara et al.

[11] 4,366,062
[45] Dec. 28, 1982

[54] REVERSE OSMOSIS USING A COMPOSITE ISOCYANURATE MEMBRANE

[75] Inventors: Masaru Kurihara; Tetsuo Watanabe, both of Ohtsu; Tetsuo Inoue, Shiga, all of Japan

[73] Assignee: Toray Industries, Inc., Tokyo, Japan

[21] Appl. No.: 232,112

[22] Filed: Feb. 6, 1981

Related U.S. Application Data

[63] Continuation-in-part of Ser. No. 214,845, Dec. 10, 1980, which is a continuation of Ser. No. 9,431, Feb. 5, 1979, abandoned.

[30] Foreign Application Priority Data

Feb. 13, 1978 [JP] Japan .................................. 53-14046

[51] Int. Cl.³ .............................................. B01D 13/00
[52] U.S. Cl. ...................................... 210/651; 210/654
[58] Field of Search ..................... 210/490, 492, 500.2, 210/506, 321, 637, 651, 652, 654, 653; 55/158; 528/254, 258, 289, 361, 363, 367, 392, 405, 423; 428/524, 525, 530, 422.8, 511; 544/221, 222; 204/296; 429/247, 249–254; 264/41, 45.1; 422/48

[56] References Cited

U.S. PATENT DOCUMENTS

| | | | |
|---|---|---|---|
| 3,088,949 | 5/1963 | Moser et al. ................. | 260/37 N |
| 3,133,132 | 5/1964 | Loeb et al. ..................... | 264/49 |
| 3,133,137 | 5/1964 | Loeb et al. ..................... | 264/49 X |
| 3,228,877 | 1/1966 | Mahon .......................... | 210/653 |
| 3,293,224 | 12/1966 | Fitz-William ................. | 528/226 |
| 3,346,534 | 10/1967 | Bills et al. ..................... | 528/254 |
| 3,378,530 | 4/1968 | Little ............................. | 528/242 |
| 3,392,082 | 7/1968 | Lloyd et al. .................... | 528/254 |
| 3,446,359 | 5/1969 | Loeb et al. ..................... | 210/490 |
| 3,477,996 | 11/1969 | Formaini ....................... | 528/289 |
| 3,567,632 | 3/1971 | Richter et al. ................. | 210/500.2 X |
| 3,593,852 | 7/1971 | Meriwether ................... | 210/490 X |
| 3,631,000 | 12/1971 | Argabright et al. ............ | 528/44 |
| 3,660,327 | 5/1972 | Loncrini et al. ............... | 260/22 TN |
| 3,744,642 | 7/1973 | Scala et al. .................... | 264/41 X |
| 3,763,269 | 10/1973 | Formaini ....................... | 528/60 X |
| 3,766,181 | 10/1973 | Pregler ........................... | 528/60 |
| 3,892,665 | 7/1975 | Steigelmann et al. ......... | 210/500.2 X |
| 3,926,798 | 12/1975 | Cadotte .......................... | 210/500.2 X |
| 3,951,815 | 4/1976 | Wrasidlo ........................ | 210/500.2 X |
| 4,005,012 | 1/1977 | Wrasidlo ........................ | 210/500.2 X |
| 4,148,734 | 4/1979 | Hilterhaus et al. ............ | 210/500.2 X |

Primary Examiner—David R. Sadowski
Attorney, Agent, or Firm—Austin R. Miller

[57] ABSTRACT

A method for the selective separation of at least one water-soluble useful material from an aqueous solution by reverse osmosis is provided. The method comprises contacting the aqueous solution under pressure maintained above the osmotic pressure of the aqueous solution with a semipermeable composite membrane. The semipermeable composite membrane comprises a microporous substrate and a barrier layer having about 0.01 to about 0.1 micron thickness and composed of a cross-linked polymeric material having isocyanurate structures of Formula (I) formed on the microporous substrate:

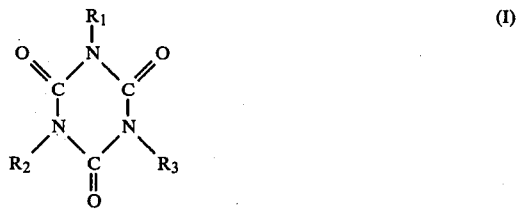

wherein each of $R_1$, $R_2$ and $R_3$ is selected from the group consisting of hydrogen, a glycidyl group, and an alkyl radical containing from 2 to 5 carbon atoms, an alkyl radical carrying a functional hydroxyl group and an alkyl radical carrying a functional glycidyl group, with the proviso that at least two of $R_1$, $R_2$ and $R_3$ are glycidyl groups, alkyl radicals carrying functional hydroxyl groups, alkyl radicals carrying glycidyl groups or a combination thereof. The cross-linked polymeric material has ether linkages, ester linkages or a combination thereof connecting the isocyanurate structures to each other.

28 Claims, No Drawings

REVERSE OSMOSIS USING A COMPOSITE ISOCYANURATE MEMBRANE

This application is a continuation-in-part of copending application Ser. No. 214,845, filed Dec. 10, 1980, in turn, a continuation of application Ser. No. 9,431, filed Feb. 5, 1979, now abandoned.

BACKGROUND OF THE INVENTION

In recent years, the reverse osmosis process, that is, a process wherein aqueous solutions containing solutes are brought into contact with semipermeable membranes under pressure maintained above the osmotic pressure exhibited by said aqueous solutions, thereby to selectively separate the solutes contained in said aqueous solutions, has become attractive for utilization in desalination of sea water or saline water, for the recovery of useful or valuable materials from waste liquids, etc. It is possible with such a process, which does not involve any phase transition nor chemical change, to realize great savings in energy and resources as compared with, for example, the evaporation method which has hitherto been a typical technique of desalinating sea water. Moreover, with this technique of separating solutes from a liquid by reverse osmosis, it is possible to separate organic compounds having markedly lower molecular weights than with the ultrafiltration method, or the like. Additionally because the operation of such a separation can be carried out under the so-called "closed" system, the process is considered to be advantageous from the viewpoints of the prevention of environmental pollution and of the betterment of the working environment.

A number of studies have been carried out in attempts to develop semipermeable membranes which satisfy practical requirements in respect of their selective separation performance; but, heretofore, semipermeable membranes that have been put to practical use may be said to be confined to those fabricated from either one of these two kinds of polymers: cellulose acetate or cellulose esters and polyamides, that is, the "Loeb" type membrane made of cellulose acetate by processes such as described in U.S. Pat. Nos. 3,133,132 and 3,133,137 or the semipermeable composite membranes which are prepared from polyamides by processes such as described in U.S. Pat. No. 3,951,815.

However, the cellulose acetate "Loeb" type membranes are restricted in use and in processability, largely because the membranes must be kept wet at all times, that is, their capability as reverse osmosis membranes is lost once the membranes are dried. These membranes have also exhibited deficiencies such as alkali or acidic degradations and biological degradation resulting in a short life. Also, these membranes are not used widely in the separation or recovery of useful materials from liquid mixtures containing organic chemicals, because the membranes have a low selectivity for useful materials. On the other hand, the prior art composite membranes have been generally subject to deficiencies such as compaction, resulting in short life, as well as undesirably low solute rejection or flux, all resulting in an inefficient operation.

Moreover, although hitherto known, semipermeable membranes including the aforesaid cellulose acetate and polyamide membranes, exhibit a fairly good selective separation capability for desalination of sea water or brackish water, their capabilities as a reverse osmosis membrane for the selective separation of aqueous solutions containing such useful materials as various kinds of organic compounds, transition metal compounds, etc., is very limited and serves for practical purposes merely with a few kinds of useful materials. They cannot be said, as a matter of fact, to meet practical requirements in respect to their performances with several, especially more than ten, kinds of useful materials.

Unlike the case of desalinating brackish water or sea water, semipermeable membranes which are intended for use in the reverse osmosis separation of aqueous solutions containing useful materials are required to have the undermentioned performance characteristics; and if these requirements are not met, it is difficult to uniformly separate quite a variety of useful materials from the aqueous solutions thereof.

(1) The membrane should exhibit a high level of selective separation capability as well as a high flux rate with various kinds of useful materials.
(2) Since the osmotic pressure of an aqueous solution containing useful materials increases in proportion to the higher degrees of concentration of useful materials, it is necessary to carry out the operation under high pressures. Accordingly, the semipermeable membrane should be capable of standing such an operation under high pressures.
(3) It should have an excellent resistance to heat, and should be free from swelling, chemical metamorphism, etc., by the solution being treated.
(4) It should exhibit a selective separation performance at a certain fixed level over a wide range of pH used.

Furthermore, with the membrane used in the art of selective separation of aqueous solutions containing useful materials, it is thought that, in addition to the characteristics required as indicated above, its physical structure, as well as its chemical properties, is also closely related to its performance. In reality, however, the selective separation mechanism of such a membrane has not yet been theoretically clarified in definite terms. As such, it is necessary to conduct measurements and evaluations of the selective separation characteristics of semipermeable membranes for the selective separation of useful materials with respect to each individual useful material, while, needless to say, such attempts are also to be made in connection with semipermeable membranes for desalination of brackish water or sea water.

The known semipermeable membranes for reverse osmosis which have been evaluated as to their performance in selective separation of useful materials as indicated above include, besides the aforesaid cellulose acetate and polyamide semipermeable membranes, those fabricated polyamide/urea membranes, so-called "NS-100", of furfuryl alcohol, generally called "NS-200", of sulfonated polyphenyleneoxide and of polybenzimidazole. Their selective separation performances have been evaluated with respect to about thirteen kinds of low molecular weight compounds including acids, aldehydes, amines, amides, esters, ethers, ketones, phenols etc. However, the overall solute separation performance (rejection), with respect to these thirteen kinds of useful materials, of such membranes are very low, being no more than 12 to 26% with cellulose acetate membrane, 50 to 60% with polyamide membrane, and 70 to 78% with "NS-100" and "NS-200" membranes (E. Chian et al., "Environmental Science and Technology", vol. 10, No. 4, p. 364 (1976); J. E. Cadotte et al., "Office of Saline Water Research and Development Progress Report", No. 982 (1974) and "Office of Water Research and Technology", OWRT/S-1976/2 (1975)).

There is a further report on a study from a more theoretical standpoint of the selective separation performance of cellulose acetate and polyamide membranes with respect to organic compounds similar to the aforesaid useful materials; and it is reported that the results obtained indicate they do not exhibit a selective separation performance that serves practical purpose with respect to low molecular weight organic compounds (S. Sourirajan et al., "Journal of Applied Polymer Science", vol. 19, p. 801 (1975)).

DETAILED DESCRIPTION OF THE INVENTION

This invention relates to a method for the selective separation of at least one water-soluble useful material from an aqueous solution by reverse osmosis comprising contacting the aqueous solution under pressure maintained above the osmotic pressure of said aqueous solution with a semipermeable composite membrane, wherein said semipermeable composite membrane comprises a microporous substrate and a barrier layer having about 0.01 to about 0.1 micron thickness and composed of a cross-linked polymeric material having isocyanurate structures of Formula (I) formed on the microporous substrate:

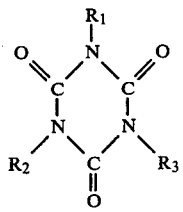
(I)

wherein each of $R_1$, $R_2$ and $R_3$ is selected from the group consisting of hydrogen, a glycidyl group, and alkyl radical containing from 2 to 5 carbon atoms and alkyl radical carrying a functional hydroxyl group and/or a functional glycidyl group, with the proviso that at least two of $R_1$, $R_2$ and $R_3$ comprise glycidyl groups and/or alkyl radicals carrying a functional hydroxyl and/or glycidyl groups;

said cross-linked polymeric material having ether (—O—) and/or ester

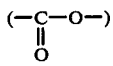

linkages connecting said isocyanurate structures to each other.

Examples of the cross-linked polymeric materials having isocyanaurate structures of Formula (I) include polymers obtained from organic compounds such as 1,3,5-tris(hydroxyethyl) isocyanuric acid (referred to hereinafter THEIC), bis(2-hydroxypropyl) isocyanuric acid and 1,3,5-tris(glycidyl) isocyanuric acid, and water-soluble intermolecular condensation product and/or addition reaction product of at least one of the above-mentioned organic compounds, for example. THEIC is particularly useful in accordance with this invention.

The cross-linked polymeric material having isocyanurate structures of Formula (I) could be employed as water-soluble condensation and/or addition reaction products which may be obtained by reacting the above organic compounds with comonomers which will be hereinafter described. Examples of such water-soluble condensation and/or addition reaction products can be obtained by heating THEIC with a little water and an acid catalyst, such as, sulfuric acid, at 140° C. for 10 minutes to yield a pasty product, and then removing the water generated in the reaction system under reduced pressure. Other water-soluble condensation and/or addition reaction products useful in this invention may also be prepared from the above organic compounds and/or comonomers according to the above method. Of course, the cross-linked polymeric materials having isocyanurate structures of Formula (I) include those obtained by reacting the water-soluble condensation and/or addition reaction products with comonomers.

Examples of comonomers which may be used in the present invention include furfuryl alcohol, tetrahydrofurfuryl alcohol, polyethylene oxide, epoxy compounds having 2 to 5 carbon atoms, multivalent alcohols having from 2 to 8 carbon atoms, multivalent carboxylic acids having from 2 to 17 carbon atoms, multivalent hydroxy acids having from 2 to 17 carbon atoms, formaldehyde, and mixtures thereof.

Examples of epoxy compounds useful in the present invention include ethylene oxide, propylene oxide or a mixture thereof; those of multivalent alcohols include ethylene glycol, glycerine, sorbitol, inositol and mixtures thereof. As examples of multivalent carboxylic acids there may be cited: oxalic acid, succinic acid, maleic acid, fumaric acid and 1,2,3,4-butane tetracarboxylic acid, and mixtures thereof; and the multivalent hydroxy acids include glycolic acid, malic acid, tartaric acid, citric acid, salicylic acid and mixtures thereof. From the named comonomers, furfuryl alcohol, ethylene glycol, and formaldehyde have been found to be exceptionally advantages for the use in the semipermeable composite membrane of the present invention, as they show exceedingly high selective rejection rates with many kinds of useful materials. In the cross-linked polymeric materials obtained from the above organic compounds, their water-soluble condensation and/or addition reaction products and comonomers thereof, the preferred $R_1$, $R_2$ and $R_3$ in the Formula (I) are as follows.

In the Formula (I), at least two of $R_1$, $R_2$ and $R_3$ are selected from the group consisting of a functional glycidyl group and a R group specified by the following Formula (II):

wherein A is selected from an alkylene radical containing from 2 to 5 carbon atoms;

B is selected from an alkylene radical containing from 1 to 17 carbon atoms;

X is ether (—O—) and/or ester

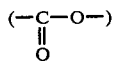

linkages;

n is zero or integer, when n is more than 1, B may be the same or different;

R' is selected from the group consisting of hydrogen, and an alkyl radical containing from 2 to 5 carbon atoms with functional hydroxyl group and/or functional glycidyl group;

and the residual one of $R_1$, $R_2$ and $R_3$ is selected from the group consisting of hydrogen, an alkyl radical containing from 2 to 5 carbon atoms and the above R group represented by the Formula (II).

In the cross-linked polymeric material having isocyanurate structures of the Formula (I), said organic compounds are combined with the R group represented by the Formula (II), and the characteristic of the present invention resides in that it has said isocyanurate structures in their high molecular cross-linked structures. The R groups defined by the Formula (II) may either be those which are produced by the direct reaction of the functional group possessed or by the organic compounds having the isocyanurate structure of Formula (I), that is, the starting materials (for example, three hydroxyl groups in the case of THEIC); or it may be those which are produced by polymerization of said functional groups possessed or by starting materials and polymers, that are reactive with them, being condensation and/or addition reaction products formed by the so-called "chain extending" reactions, retaining water-solubility; or again may be those which are formed by reaction of those starting materials represented by the Formula (I), water-soluble condensation reaction products, or mixtures thereof, with comonomers.

The R groups represented by the Formula (II) have a variety of chain lengths depending upon the kinds of comonomers selected. However, said R groups are those having the ether linkages and/or ester linkages, that is, said cross-linked polymeric materials may be said to be, fundamentally, that which consists of polyethers, polyesters, or polyether-esters.

In case the organic compounds having isocyanurate structure of the formula (I) are bifunctional compounds, it is necessary, of course, to cause said cross-linked polymeric material to have a three-dimensional cross-linked structure by means of the functional group that link with the group defined by the Formula (II) and, thus, to employ multivalent, at least trifunctional compounds as co-monomers.

As for the ratio of the organic compound having the isocyanurate structure of the Formula (I) to the comonomer employed for the reaction, a ratio of at least 15 weight percent to not more than 85 weight percent, respectively, may be employed. Preferably, they should be employed at the ratio of about 20 percent up to about 80 percent by weight of the compound having the isocyanurate structure of the Formula (I) to about 80% down to about 20% by weight of the comonomer, respectively.

According to this invention, the barrier layer is prepared by applying heat to an aqueous solution or a water-soluble organic solution (referred to hereinafter as the coating solution for reasons which will appear in further detail hereinafter) containing at least one organic compound having an isocyanurate structure represented by the Formula (I) and/or a water-soluble condensation and/or addition reaction products thereof, a comonomer selected from the group consisting of the above-mentioned compounds and a solvent at a temperature of about 100° to 170° C. in the presence of an acid catalyst, on the surface of a microporous substrate. It is important that an acid catalyst is employed to produce the cross-linked polymeric material of the present invention. Suitable examples of such acid catalysts include sulfuric acid, phosphoric acid, hydrogen chloride, methane sulfonic acid, benzene sulfonic acid and toluene sulfonic acid.

The semipermeable composite membrane of the present invention is very difficult to prepare from a cross-linked polymeric material having isocyanurate structures of Formula (I), because the cross-linked polymeric material is substantially insoluble in solvents such as water and organic solvents, particularly when a high molecular weight or cross-linked polymer is used. The semipermeable composite membrane of the present invention is, therefore, prepared by coating or dipping the coating solution on various substrates, followed by heating (curing) the coated substrates in an oven at temperature of about 100° to 190° for a period of about 1 to 30 minutes to polymerize the monomers. It is possible to use a water-soluble condensation and/or addition reaction products as the coating solution of the present invention, which products are produced by heating an an organic compound having an isocyanurate structure of the Formula (I). For example, THEIC may be heated in a formaldehyde aqueous solution at about 100° C. for 30 minutes.

In addition to the organic compound having the isocyanurate structure of the Formula (I) and their water-soluble condensation and/or addition reaction products, comonomers and acid catalyst, the coating solution may, optionally, contain other additives. For example, other solvents such as methyl alcohol, ethyl alcohol, propyl alcohol or isopropyl alcohol may be used to improve the pot life of the coating solution. Anion surfactants such as dodecyl sodium sulfate, sodium dodecylbenzene sulfonate, "Demol-N" (KAŌ Soap Co. Ltd., Japan), and nonion surfactants such as polyethylene glycol, polyethylene glycol monostearate, polyethylene glycol monoalkylether, or "Tween" (Atlas Powder Co.) may also be added to the coating solution to improve the surface wettability of the substrate.

Optimum concentrations of the coating solution may vary considerably depending on the nature of the specific catalyst of the substrate, and of the feed solution, as well. Generally, however, the optimum concentration of the compound having the isocyanurate structure of the Formula (I) and/or its water-soluble condensation and/or its addition reaction products (computed as heretofore mentioned) is about 0.5 to 10% by weight, preferable about 1 to 2% by weight. The ratio of the acid catalyst to the compounds having the isocyanurate structure of the formula (I) and/or their water-soluble condensation and/or their addition reaction products is also not critical, however, a ratio in a range of about one part by weight of catalyst per 20 parts by weight of the compound and/or the water-soluble reaction products thereof have been employed and have been found to give good results.

The water-soluble condensation and/or addition reaction products may be employed in an amount of about 1 to 8% by weight, preferably about 2 to 6% by weight, and the catalyst may be added in an amount of about 0.5 to 1 part by weight to one part by weight of the water-soluble condensation and/or addition reaction products.

It is further noted that a thickness of the barrier layer comprising the above cross-linked polymeric material having the isocyanurate structures of Formula (I) is required to be within the range of about 0.01 to 0.1 micron, preferably within the range of 0.015 to 0.05 micron. Where the thickness is greater than about 0.1 micron, the flux lowers and it is difficult to separate useful materials at a rate that serves the practical purposes; while, in case the thickness is smaller than about 0.01 micron, there arises a problem with regard to its durability.

The microporous substrates used in the present invention may be any one of the types conventionally used in the reverse osmosis composite membranes. The preferred substrates, however, are those prepared from organic polymers such as polysulfone, chlorinated polyethylene, polyvinyl chloride, polycarbonate, polyvinylidene chloride, polyacrylonitrile and copolymers thereof. Alternatively, glass plates or metal drums may be used as substrates for preparing the semipermeable composite membranes of the present invention. The preferred microporous substrate is a polysulfone substrate.

Various substrate shapes may be used other than microporous film-like substrates. Shapes such as hollow fibers or tublar pipes are useful. Preparation of the microporous substrates is described in the "Office of Saline Water Research and Development Progress Report" No. 359 (1968).

The microporous polysulfone substrate(flat film or hollow fiber) having an anisotropic structure, that is, a membrane in which the pore diameter varies from one surface of the membrane(in case of the hollow fiber membrane, the exterior surface) toward its another surface, may be prepared by forming into a flat film or a hollow fiber a polysulfone solution composed of a water-soluble solvent such as dimethylformamide(DMF). This is followed by immersion in a coagulation bath that is substantially composed of water to gel the film or fiber. Preferably, the polysulfone substrate should have an average pore diameter in the range of 10 to 1,000 Angstroms(Å) on its surface where the barrier layer is formed, and an average pore diameter of about 1 to 100 microns on the opposite side. Thus, the pore diameter grows integrally larger from the front surface toward the back surface. The porosity of the surface where the barrier layer is formed is about 10 to 20% and may become gradually larger from the inner portion to the back surface. The polysulfone substrate to be useful in the present invention should have a favorable pore structure in addition to durability in compaction and resistance to the action of various chemical reagents. The smaller the pore size on the surface of the substrate becomes, the greater becomes the supporting effect. Therefore, when the membrane is pressurized, this yields a higher solute rejection. Conversely, a larger surface porosity of the substrate yields a higher flux due to reduced water flow resistance through the membrane. The addition of a surfactant to the coagulating bath in some cases causes the substrate to have more favorable performance characteristics.

In the case of the tubular formulation, the polysulfone microporous substrate is cast directly on a porous tube and is then composed as a composite membrane. In the case of a hollow fiber, the polysulfone substrate is formed as a hollow fiber and then formed as a composite membrane. Additionally, in the case of the spiral module, the polysulfone substrate is first formed on a reinforcing fabric, for example, and then formed into a composite membrane.

Coating methods which are of themselves commonly known are applicable to the process of covering the substrate with the coating solution. For example, the method may include coating the solution, spraying the solution on the substrate, or dipping the substrate in a solution. Generally, the usual method involves dipping the substrate in the solution for a period of a few seconds to a few hours, to adhere and to absorb the desired amount of coating solution. The coating solution may be drained if an excessive amount has been adhered or absorbed. Drainages may not be needed when the amount is adequate.

The coated substrate thus obtained is placed in a convection oven and heated to about 100° to 190° C.; the components of the coating solution begin to polymerize and also to cross-link with the polymer main structure. The reaction period varies with the components and the temperature, but is normally about 1 to 30 minutes, preferably about 5 to 15 minutes. The cross-linked semipermeable composite membrane thus obtained may be used as is, but generally post-treatment is applied, such as, washing the acid catalyst and neutralization of the produced acid groups by use of an alkaline solution. The alkaline solution may be a monovalent organic or inorganic base but more preferably, considering the ion cross-linking, a solution containing multivalent cations are used. Preferable cations include copper(cuprous or cupric), magnesium, calcium, aluminum and iron(ferrous or ferric).

Another useful post-treatment involves treatment with an organic compound which reacts rapidly with the active sites such as the unreacted hydroxyl groups or epoxide groups at the surface of the composite membrane. This post-treatment provides good stretch resistance on the membrane surface.

Furthermore, the semipermeable composite membrane thus obtained gives satisfactory results in the selective separation of many useful materials. However, an improvement may be brought about by further processing the composite membrane in the following manner. That is, on the surface of said barrier layer, there is formed, for its protection, a water-insoluble protective membrane consisting of polyvinyl alcohol and/or partially saponified polyvinyl acetate, having a thickness within the range of about 0.1 to 10 microns, preferably 0.5 to 2 microns. It prevents mechanical damages being done to the barrier layer, lowering of the properties of said semipermeable composite membrane in the course of its fabrication to module, and lowering of selective separation performance of the membrane in the course of its use for actual operation, thus making it fit for the operation over a long period of time. Also, for some useful materials, there is brought about an improvement in the selective separation performance of the semipermeable composite membrane by this formation of the protective layer. However, the thickness of this protective layer should be within the range of about 0.1 to 10 microns. Where the protective layer is thicker than about 10 microns, it often proves to be detrimental to the selective separation performance of the barrier layer, causing the lowering of the flux and, in some cases, exfoliation and a falling-off of the protective layer in the course of operation over many hours. Where the protective layer is thinner it does not function as a protector of the barrier layer, nor does it produce the effect of bettering the selective separation performance.

As for the partially saponified polyvinyl acetate, from said polyvinyl alcohol and/or partially saponified polyvinyl acetate that is employed for the formation of the protective layer, when the degree of saponification, $n/(m+n)$, in the following general formula:

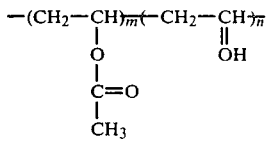

is more than 0.70, it may be employed to better advantages. In the case where its degree of saponification is less than 0.70, it will not dissolve easily in water. The degree of polymerization, (m+n), should be preferably within the range of 100 to 3,000. In case it is below the lower limit, the water-solubility of the material will be too strong and there may sometimes arise a problem in respect of the durability of the protective layer; while, in case it exceeds the upper limit, the viscosity of the aqueous solution of the material will be too high and it will be difficult to make an adjustment of the thickness of the protective layer.

The above polyvinyl alcohol or partially saponified polyvinyl acetate may be applied on the surface of the composite membrane as its aqueous solution. As the solvent, only water is generally used, but a small amount of other solvents which are not liable to cause deterioration of the composite membrane, for example, alcohols, etc., may eventually be mixed into the water. The concentration of polymers in the aqueous solution should be in the range of 0.2 to 5%, preferably 0.5 to 1.5%. This concentration of polymers, together with the method of coating, determines the thickness of the protective layer. An acid catalyst for causing polyvinyl alcohol and/or the partially saponified polyvinyl acetate to become water-insoluble is added to this aqueous solution of polymers. Water-soluble acid catalysts as previously noted, for example, sulfuric acid and phosphoric acid, may be employed to advantage. Also, in case the acid catalyst used for the formation of the barrier layer remains in it, this acid catalyst migrates into the protective layer while it is being formed so that there is no particular need for adding an acid catalyst to said aqueous solution of polymers. Furthermore, a resin or polymer which is capable of forming a cross-linkage with polyvinyl alcohol, for example, melamine resin, etc., may be advantageously added to said aqueous solution of polymers to strengthen the cross-linkage. Still further, a surface active agent may be added to said aqueous solution of polymers in order to improve its wettability with the surface of the barrier layer so that it may attach evenly to the entire surface.

To coat the composite membrane with the aqueous solution of polymers, any one of the known methods may be applied. For example, the composite membrane may be coated with the aqueous solution of polymers by means of rollers, or the like means; the composite membrane may be dipped in the aqueous solution; the aqueous solution of polymers may be sprayed over the composite membrane; and so forth. From these methods coating by means of rollers would be preferable, since, it is easy to make an adjustment of the thickness. The coating may be carried out with the aqueous solution of polymers at a temperature in the range of about 10° to about 30° C. The heat treatment condition would vary with the means of drying employed, that is, the type of dryer used; but, in the case of a hot-air drier in common use, a heat treatment temperature in the range of about 80° to about 120° C. and a heat treatment time in the range of about 1 to 10 minutes may be used to advantage.

The protective layer thus formed has a thickness of about 0.1 to 10 microns; and because of this thickness of the layer, there is produced an interference pattern on the surface of the layer.

Said protective layer will not fall off even after a long duration of use. It will not only markedly improve the durability of the composite membrane but will also improve its performance as a semipermeable membrane.

The semipermeable composite membrane obtained by the method described in the foregoing may be fabricated to modules in accordance with known methods. For example, when said semipermeable composite membrane is in the form of a flat membrane, it may be fabricated into a spirally wound element as disclosed in U.S. Pat. Nos. 3,933,646 and 3,367,504. That is, the aforesaid semipermeable composite membrane may be laminated with materials which form the passage for the solution being treated and a permeant liquid, and is made into an envelope-like sheet. This sheet may be spirally wound around a pipe with perforations, which constitutes the core of the element, with the end of said envelope-like sheet for discharge of the permeant liquid connected to the bore of said pipe. The element thus formed may be housed in a high pressure chamber, and may be employed as a reverse osmosis separation apparatus for the selective separation of aqueous solutions containing useful materials.

A reverse osmosis separation apparatus provided with the semipermeable composite membrane of the present invention, will exhibit an excellent selective separation performance with various kinds of organic compounds and transition metal compounds, as well as with boric compounds, typical of which is boric acid.

While it may be necessary that the useful materials that can be selectively separated by the method of this invention be, basically, those which exhibit water-solubility, the method is sufficiently workable with aqueous solutions containing at least the following useful materials, viz., organic compounds which are hydrocarbon and hydrocarbon derivatives having at least one out of these three kinds of elements, oxygen, sulfur and nitrogen, wherein the total number of atoms of carbon, hydrogen, oxygen, sulfur and nitrogen is within the range of 7 to 30; boric compound; and transition metal compounds.

Said organic compounds are at least one selected from the group consisting of aliphatic alcohols having from 1 to 8 carbon atoms, aldehydes having 2 to 8 carbon atoms, ketones having 3 to 8 carbon atoms, phenols having 6 to 13 carbon atoms, amides having 1 to 8 carbon atoms, esters having 2 to 10 carbon atoms, ethers having 4 to 8 carbon atoms, amines having 2 to 10 carbon atoms, hydroxy acids having 3 to 7 carbon atoms, and aprotic-polar solvents having 2 to 6 carbon atoms, other than the above-mentioned compounds. As examples of transition metal compounds there may be noted Ni, Co, Fe, Cr, U, Ag, Au, Cu, Mo, W, Hg and Pt compounds which form ions and complex ions, for example, with boric compounds, i.e. boric acid.

Examples of the aforesaid aliphatic alcohols include at least one member selected from the group consisting of methyl alcohol, ethyl alcohol, propyl alcohol, cyclohexanol, ethylene glycol, glycerine, sorbitol and cyclohexanediol. The carboxylic acids include acetic acid, propionic acid, malonic acid, butyric acid, benzoic acid, toluic acid, oxalic acid, phthalic acid and trimellitic acid. Examples of aldehydes include acetaldehyde, propinaldehyde, furfural and benzaldehyde; and those of ketones include acetone, methyl ethyl ketone, cyclohexanone and acetophenone. As examples of ethers, diethyl ether, anisole, tetrahydrofuran, tetrahydropyrane, dioxane and styrene oxide and as the esters there is included methyl acetate, ethyl acetate, methyl benzoate and methyl acrylate. The amines include ethylamine, benzylamine, aniline, toluidine, piperidine, piperazine, dimethylamine, trimethylamine and pyridine. Amides may be exemplified by formamide, acetamide, N,N-dimethylacetamide, urea and $\epsilon$-caprolactam. Further, as examples of phenols there may be mentioned phenol, cresol, resorcinol, hydroquinone, aminophenol and pyrogallol. The hydroxy acids include lactic acid, malic acid, tartaric acid and citric acid.

As examples of aprotic-polar solvents, dimethylsulfoxide, N,N-dimethylformamide, N,N-dimethylacetamide and N-methyl-pyrrolidone may be mentioned.

Examples of transition metal compounds would include nickel cyanide, sodium chloroplatinate, potassium chlorate, sodium ferrocyanide, sodium ferricyanide, copper sulfate, silver nitrate, uranium nitrate, cobaltous chloride and chromium chloride.

The selective separation by the use of the semipermeable composite membrane of the present invention of aqueous solutions containing water-soluble useful materials exhibits an average rate of selective rejection of as high as at least 80%. In particular, it shows an outstandingly good selective separation performance wth ethylene glycol, $\epsilon$-caprolactam, ethyl alcohol, tetrahydrofuran, phenol, aniline, ethylacetate, methylethylketone, N,N-dimethylformamide, N,N-dimethylactamide, dimethylsulfoxide, cupric ion, cobaltous ion, silver ion, nickel ion and boric acid. As such, its industrial significance is exceedingly great, and may be used widely for practical purposes in various sectors of the industry, such as textile, organic chemical and metal plating industries, and in the field of concentration of ethanols formed by fermentation and decomposition of natural materials (utilization of biomass), etc., as well as in the technology of the treatment of waste water containing organic compounds as indicated above.

Although no particular limitation is placed upon the concentration of useful materials contains in aqueous solutions to be treated by the method of this invention, the method is particularly effective in the selective separation of useful materials from their aqueous solutions at lower concentrations, such being the merit of the reverse osmosis process. Accordingly, it is desirable that the concentration of useful materials in the solution is treated by the method of this invention in the range of about 0.01 to 20% by weight, more preferably about 0.1 to 10% by weight.

Furthermore, the useful material contained in the solution being treated is not necessarily limited to only one, but the solution may contain two or more kinds of useful materials. The method may also be utilized for the treatment of brackish water or sea water containing these water-soluble useful materials.

As will be seen from the foregoing detailed description, the method of selective separation of the present invention permits the seletive separation of specific solutes contained in aqueous solutions without involving phase transition, chemical changes and the change of temperature; that is, it utilizes the characteristics of the reverse osmosis process, which are very advantageous in respect of savings in energy and resources, especially for the selective separation of water-soluble useful materials. The method of this invention is quite a "universal" method of selective separation which, in virtue of the superb capability of the semipermeable composite membrane therein used, permits the selective separation of at least ten kinds of useful materials, and that, at a rate of selective separation of as high as at least 80%, often exceeding 90% depending upon the conditions. As such, the method may be utilized to great advantage in the following industrial fields.

(1) It can be effectively utilized, in the chemical industry for the separation and recovery of various kinds of organic compounds contained in aqueous solutions that arise in the process of manufacturing such organic compounds, as well as in various kinds of manufacturing processes using organic chemicals, removal of unwanted ingredients, that is, impurities, from aqueous solutions containing such organic compounds for the purpose of refining. For instance, in the synthetic fiber manufacturing processes where large amount of fiber-producing materials and solvents, such as $\epsilon$-caprolactam, ethylene glycol, terephthalic acid, dimethylsulfoxide, dimethylformamide, etc., are used; and, in waste liquids that are discharged in the processes contain said fiber-producing materials and solvents at irregular concentrations. In the treatment of these waste liquids, it is possible to apply the reverse osmosis process only when a semipermeable membrane possesses chemical resistance. The present invention not only makes such possible, but also permits the recovery and reutilization of said fiber-producing materials and solvents. Also, where waste water treatments are carried out under the so-called "closed system", the method of the invention is very advantageous from the viewpoint of the prevention of environmental pollution.

(2) The utilization of lower alcohols, such as methanol or ethanol, formed by fermentation and decomposition of natural products, for example, the utilization of biomass is attracting a good deal of public attention as an energy source in the future taking the place of the oil resources. Since these lower alcohols from biomass are obtainable only as their aqueous solutions at a low concentration of a mere several percent, it is impossible to utilize them in that form are as a souce of energy, like fuel, and it is necessary to resort to some means of concentrating them. This invention makes it possible, by virtue of its characteristics of selective separation in an energy-saving manner, to concentrate these aqueous solutions of lower alcohols at low concentrations very advantageously by a simple and easy process.

(3) With the metal plating industry, the treatment of waste plating solutions and of liquids used for the cleansing of the products is a big problem. For such treatment to recover expensive transition metals as gold, silver, copper, nickel, chromium, cobalt, etc., and to eliminate such poisonous substrates as boric acid, prussic acid, etc., complex processes and a great deal of energy are required. The method of this invention makes it possible to simplify, by a large measure, such processes of treating waste plating solutions and waste liquids arising from cleansing of the products, and to also realize a great saving in energy. Moreover, its adoption brings about a great advantage in the aspect of the prevention of environmental pollution and the improvement of working environment, because the processes can be carried out under the so-called "closed system". Furthermore, while a large amount of water is used for the treatment of waste plating solutions or cleansing liquids, as above, the application of the method of this invention permits the recovery and reutilization of water and thus realizes a great saving in water used. This is another advantage of the method of this invention.

(4) Still further, it is common, in conventional waste water treatment procedures, that the kind of low molecular weight organic compounds and transition metal compounds are not limited to just one, but several kinds of compounds are contained in the waste water being treated. Since the semipermeable composite membrane used in this invention exhibits its capability of selective separation with at least ten kinds of useful materials, it is possible to apply the method of the invention also to such waste water treatment, for instance, treatment of brackish water or sea water containing useful materials, as was previously indicated.

In addition, by choosing selectively the components of the coating solution, a membrane can be obtained which has excellent resistance to chlorine in the feed solution.

Also, the membrane of this invention has excellent durability and exhibits exceedingly high rejection of organic chemicals such as $\epsilon$-caprolactam, for example. Accordingly, it is highly useful for concentration or reclamation processes in which useful materials are separated from solution.

This invention is further illustrated by reference to specific examples, but is not intended to be limited by them, since the scope of the invention is defined by the appended claims.

In the Examples which follow, solute rejection (%) and flux ($m^3/m^2$ day) are calculated as follows:

$$\text{solute rejection (\%)} = \frac{C_1 - C_3}{C_1} \times 100$$

wherein
$C_1$ is the solute concentration in the feed and
$C_3$ is the solute concentration in the permeate
flux ($m^3/m^2$ day) = Q/S
wherein
Q = quantity of solvent passing through the membrane per day ($m^3$/day), and
S = active membrane surface ($m^2$).

EXAMPLE 1

In the preparation of a film from an isocyanurate derivative, 5 grams of THEIC, 94 grams of water and 0.3 grams of 95% sulfuric acid were mixed in a flask and dissolved. A glass plate was covered with this solution and heated 15 minutes at 150° C. in a convection oven (Safety Oven SHPS-220, TABAI MFG. CO. LTD.)

The film thus obtained was not soluble in water or N-methylpyrrolidone. The infrared spectrum (HITACHI-EPI-S2) of the film showed 1,695 $cm^{-1}$, 1,460 $cm^{-1}$ and 765 $cm^{-1}$ due to the isocyanurate ring, 1,115 $cm^{-1}$ due to the newly formed ether bond (C—O—C). The bond at 3,500 $cm^{-1}$ due to the hydroxyl group, which is characteristic of the monomer, was generally reduced.

EXAMPLE 2

A polyester woven fabric (taffeta) having a warp density of 90/inch and a woof density of 67/inch, and having a thickness of 160 $\mu$m, woven by using 150 denier multifilaments 20 cm by 30 cm, was set on a glass plate. A dimethylformamide (DMF) solution containing 15% polysulfone (Union Carbide Co. Ltd. Udel P-3500) was cast upon the glass plate at about 200 $\mu$m thickness, at room temperature (15° to 30° C.). Immediately the product was immersed into water containing 0.5% by weight of sodium dodecyl sulfate at room temperature for 5 minutes. The product was then washed for one hour, using pure water.

The resulting fiber reinforced polysulfone substrate (FR-PS) had 200 $\mu$m thickness are had a pure water permeability of 0.1 to 0.2 $g/cm^2$ sec. atm. under conditions of 1 $Kg/cm^2$ driving pressure and a feed temperature of 25° C.

From analysis by electron microscope photographs, the FR-PS possessed 600 pores per square micrometer ($\mu m^2$), and each of the pores was between 100 and 500 Angstroms in diameter.

The wet FR-PS was immersed 10 minutes at room temperature in a water solution containing 2% by weight of THEIC, 0.7% by weight of sodium dodecylsulfate and 0.1% by weight of sulfuric acid. Then the FR-PS was carried out and held one minute with the short dimension of the FR-PS in a vertical position to drain excess coating solution, after which it was clamped between 2 cm iron strips (150 grams each piece) and was suspended in a convection oven with the long dimension in a horizontal position for 20 minutes at 150° C.

The reverse osmosis performance of this membrane was 0.02 $m^3/m^2$ day flux and 96.7% rejection under the conditions (referred to hereinafter as standard conditions):

| | |
|---|---|
| driving pressure: | 40 $Kg/cm^2$ |
| feed solution: | 0.25 wt % NaCl aqueous solution |
| feed temperature: | 25° C. |
| Sampling: | after 24 hours run. |

EXAMPLE 3

A polyester woven fabric (taffeta) having a warp density of 90/inch and a woof density of 67/inch, and having a thickness of 160 micron-meter ($\mu$m), woven by using 150 deniers filaments 20 cm by 30 cm, was set on a glass plate. A dimethylformamide(DMF) solution containing 15% polysulfone (Union Carbide Co. Ltd. "Udel" P-3500) was cast upon the glass plate at about 200 $\mu$m thickness, at room temperature (15° to 30° C.). The product was immediately immersed into water containing 0.5% by weight of sodium dodecyl sulfate and room temperature for 5 minutes. The product was then washed for one hour using pure water.

The resulting fiber reinforced polysulfone substrte (FR-PS) had a 200 $\mu$m thickness and had a pure water permeability of 0.1 to 0.2 $g/cm^2$ sec. atm. under conditions of 1 $Kg/cm^2$ driving pressure and a feed temperature of 25° C.

From analysis by electron microscope photographs, the FR-PS possessed 600 pores per square micron meter, and each of the pores was between 100 to 500 angstroms in diameter.

The wet-FR-PS was immersed 15 minutes at room temperature in water solution containing 4% by weight of THEIC, 2% by weight of furfuryl alcohol(FA) (mole ratio: THEIC/FA=43/57), 2% by weight of ethylene glycol, 4% by weight of sulfuric acid and 20% by weight of isopropyl alcohol. Then the FR-PS was carried out and held one minute with the short dimension of the FR-PS in a vertical position to drain excess coating solution, after which it was clamped between 2 cm iron strips (150 grams each piece) and was suspended in a convection oven with the long dimension in a horizontal position for 20 minutes at 150° C.

Membrane performance toward ε-caprolactam was measured by using the membrane obtained under the following conditions:

| Feed solution: | water containing 5% ε-caprolactam |
|---|---|
| Feed temperature: | 50° C. |
| Driving pressure: | 40 Kg/cm$^2$ |

The flux was 0.4 m$^3$/m$^2$.day and ε-caprolactam rejection was 98%.

EXAMPLE 4

88 grams of THEIC and 10 grams of water were mixed and stirred for 10 minutes at 130° C., after which the temperature was raised to 140° C. and 2 grams of sulfuric acid were added. Ten minutes later stirring was stopped, and the water was evaporated off in a vacuum. A condensed oligomer of THEIC was obtained.

The membrane fabrication method was the same as Example 2, except for the use of a coating solution which contained 2 wt % of the foregoing condensed oligomer of THEIC, 0.7 wt % of dodecyl sodium sulfate and 0.1 wt % of sulfuric acid.

The performance of this membrane was 0.1 m$^3$/m$^2$ day and 97.5% rejection under standard conditions.

EXAMPLES 5 TO 16

The performance of membranes under standard conditions, obtained from several monomers using the same fabrication methods as in Example 2, are listed in Table 1.

EXAMPLE 17

The membrane performance of Example 4 under the following conditions was 0.15 m$^3$/m$^2$ day flux and 97% rejection, and after 100 hours test this performance was maintained.

| The test conditions were as follows: | |
|---|---|
| Feed solution: | 0.25% NaCl plus 150 ppm Cl$_2$ aqueous solution |
| Feed temperature: | 25° |
| Driving pressure: | 40 kg/m$^2$ |

EXAMPLE 18

The membrane fabrication was the same as Example 3 except that polyethylene glycol (M.W.=20,000) was used instead of ethylene glycol.

Membrane performance toward DMF was measured by using this membrane under the following conditions:

| Feed solution: | water containing 10% DMF |
|---|---|
| Feed temperature: | 50° C. |
| Driving pressure: | 50 Kg/cm$^2$ |

The flux was 0.2 m$^3$/m$^2$ day and DMF rejection was 95%.

TABLE 1

| Example | THEIC (wt %) | Comonomer (wt %) | THEIC/Comonomer (mole ratio) | Curing (°C./minutes) | Rejection (%) | Flux (m$^3$/m$^2$ day) | H$_2$SO$_4$ (%) |
|---|---|---|---|---|---|---|---|
| 5 | 1 | — | — | 150/20 | 78 | 0.71 | 0.1 |
| 6 | 2 | 1 (EG) | 33/67 | 150/20 | 96.3 | 0.05 | 0.1 |
| 7 | 2 | 1 (PEG 400) | 73/27 | 150/20 | 95.0 | 0.03 | 0.1 |
| 8 | 2 | 1 (Sorbitol) | 62/38 | 150/20 | 97.0 | 0.04 | 0.1 |
| 9 | 2 | 4 (DEG) | 17/83 | 150/20 | 64.0 | 0.003 | 0.1 |
| 10 | 2 | 4 (glycerol) | 16/84 | 150/20 | 77.0 | 0.002 | 0.1 |
| 11 | 4 | 2 (inositol) | 58/42 | 175/15 | 96.0 | 0.02 | 4 |
| 12 | 4 | 2 (BTCA) | 65/35 | 175/15 | 80 | 0.001 | 4 |
| 13 | 4 | 2 (BTS) | 62/38 | 175/15 | 85 | 0.001 | 4 |
| 14 | 4 | 2 (TGIC) | 68/32 | 175/15 | 89 | 0.01 | 4 |
| 15 | — | 1 (TGIC) | — | 150/20 | 88 | 0.01 | 2 |
| 16 | — | 5 (TGIC/EG = 1/1) | — | 150/20 | 56 | 0.5 | 0.3 |

EG: ethylene glycol
PEG 400: polyethylene glycol (molecular weight 400)
DEG: diethylene glycol
BTCA: 1,2,3,4-benzene tetracarboxylic acid
BTS: 1,2,3,4-butane tetracarboxylic acid
TGIC: tris-(glycidyl)isocyanurate

EXAMPLE 19

Membrane performance toward dimethyl sulfoxide (DMSO) was measured by using the membrane of Example 3 under the following conditions:

| Feed solution: | water containing 10% DMSO |
|---|---|
| Feed temperature: | 50° C. |
| Driving pressure: | 50 Kg/cm$^2$ |

The flux was 0.15 m$^3$/m$^2$ day and the DMSO rejection was 96%.

EXAMPLE 20

An aqueous solution containing 1% by weight of THEIC, 2% by weight of FA (THEIC/FA mole ratio=16/84), 2% by weight of sulfuric acid, 1% by weight of sodium dodecylsulfate and 20% by weight of isopropyl alcohol is prepared; and in this aqueous solution was dipped the FR-PS substrate of Example 3, wet with water for five minutes at 15° C. Then, the FR-PS substrate was taken out; its two ends, lengthwise, are held between 2-cm wide steel plates (150 g/pce.); and it was hung perpendicularly for one minute at a temperature of 20° C. Then, the FR-PS substrate, maintained in such a condition, was placed in a hot-air dryer and dried at 130° C. for three minutes, followed by a heat treatment at 150° C. for five minutes. Then the membrane was fixed flat on a glass plate, and on its surface was coated with an aqueous solution of 1% by weight of polyvinyl alcohol of which the degree of saponification 100 mole % and the degree of polymerization 1,500 (NM-14 mfd. Nippon Synthetic Chemical Industry Co., Ltd.) at the room temperature (20° C.). The coating was finished to a thickness of 50 microns using a doctor blade. Then, it is put in a hot-air dryer, and subjected to heat treatment at 90° C. for two minutes.

On the surface of the composite membrane thus obtained, there was observed an interference pattern formed by the thin film of polyvinyl alcohol. Further, the thickness of the two layers of the composite membrane were measured by an electron microscope observation, and these values were obtained: the barrier layer=30 millimicrons, and the protective layer=0.4 to 0.5 micron.

Using this membrane, tests were conducted of its selective separation performance with a 5% aqueous solution of three kinds of above mentioned useful materials ($\epsilon$-caprolactam, DMF and DMSO), at temperature of 30° C. and under a pressure of 60 Kg/cm$^2$ respectively.

The results are shown in Table 2 below.

TABLE 2

| Useful material | Rejection (%) | Water Flux (m$^3$/m$^2$, day) |
|---|---|---|
| $\epsilon$-caprolactum | >99.9 | 0.35 |
| DMF | 98 | 0.34 |
| DMSO | 99.6 | 0.36 |

EXAMPLE 21

Using the membrane of Example 20, a test was carried out of its selective separation performance with a 6% aqueous solution of ethyl alcohol, at temperature of 25° C. and under pressure of 60 Kg/cm$^2$; and the efficiency was measured at these points of time: 24 hours and 500 hours after starting the operation. The results obtained are shown in Table 3 below.

TABLE 3

| | Rejection (%) | Water Flux (m$^3$/m$^2$ day) |
|---|---|---|
| After 24 hours | 97.0 | 0.26 |
| After 500 hours | 96.8 | 0.27 |

EXAMPLE 22

Using a membrane made in the same manner as in Example 20, except that the coating of polyvinyl alcohol was not applied, that is, a membrane without the protective layer, a test was carried out of its separation performance with a 6% aqueous solution of ethyl alcohol, at a temperature of 25° C. and under pressure of 60 Kg/cm$^2$; and the efficiency was measured at these points of time: 24 and 500 hours after starting the operation. The results obtained are shown in Table 4 below.

TABLE 4

| | Rejection (%) | Water Flux (m/m · day) |
|---|---|---|
| After 24 hours | 96.5 | 0.26 |
| After 500 hours | 95.0 | 0.28 |

EXAMPLE 23

88 grams of THEIC and 10 grams of water were mixed and stirred for 10 minutes at 130° C., after which the temperature was raised to 140° C. and 2 grams of sulfuric acid were added. Ten minutes later stirring was stopped, and the water was evaporated off in a vacuum. A condensed oligomer (water-soluble condensation reaction product) of THEIC was obtained.

The membrane fabrication method was the same as Example 3, except for the use of a coating solution which contained 2% by weight of the foregoing condensed oligomer of THEIC, 0.7% by weight of dodecyl sodium sulfate and 0.1% by weight of sulfuric acid. Membrane performance toward tetrahydrofuran(THF) was measured under the following conditions:

| Feed solution: | Water containing 1% THF |
|---|---|
| Feed temperature: | 30° C. |
| Driving pressure: | 60 Kg/cm$^2$ |

The flux was 0.1 m$^3$/m$^2$ day and the rejection was 90%.

EXAMPLE 24

The membrane was fabricated in the same way as Example 3, except that a solution of the following components was used:

| THEIC | 1% by weight |
|---|---|
| Inositol | 1% by weight |
| FA | 2% by weight |
| Sulfuric acid | 2% by weight |
| Dodecyl sodium sulfate | 0.7% by weight |
| Isopropyl alcohol | 20% by weight |

Membrane performance toward phenol was measured under the following conditions:

| Feed solution: | water containing 1% phenol |
|---|---|
| Feed temperature: | 30° C. |

Driving pressure: 60 Kg/cm$^2$

The flux was 0.20 m$^3$/m$^2$.day and the phenol rejection was 92%.

EXAMPLE 25

Using a membrane made in the same manner as in Example 20, except that the heating condition was different, a FR-PS substrate dipped in the coating solution was dried at 140° C. for three minutes followed by a heat treatment at 160° C. for five minutes.

Using this membrane, tests were conducted of its selective separation performance with a 1% aqueous solution of phenol and a 1% aqueous solution of urea, at temperature of 30° C. and under pressure of 60 Kg/cm$^2$.

The results obtained are shown in Table 5.

TABLE 5

| Useful material | Rejection (%) | Water Flux (m$^3$/m$^2$ · day) |
|---|---|---|
| Phenol | 99.0 | 0.24 |
| Urea | 85 | 0.57 |

EXAMPLE 26

An aqueous solution containing 4% by weight of THEIC, 2% by weight of FA (THEIC/FA mole ratio=43/57), 4% by weight of surfuric acid, 1% by weight of sodium dodecylsulfate and 20% by weight of isopropyl alcohol, was prepared and aged for 15 minutes at room temperature. Then, using the FR-PS substrate of Example 3, samples of composite membranes were fabricated in the same manner as in Example 20. Using said membrane, tests were conducted of its separation performance with a 5% aqueous solution of acetic acid and a 5% aqueous solution of ethylene glycol, at temperature of 30° C. and under pressure of 60 Kg/cm$^2$. The results obtained are shown in Table 6.

TABLE 6

| Useful material | Rejection (%) | Water Flux (m$^3$/m$^2$ · day) |
|---|---|---|
| Acetic acid | 81 | 0.40 |
| Ethylene glycol | 94 | 0.40 |

EXAMPLE 27

A polysulfone substrate was made in the same manner as in Example 3, except that, instead of using, in the process of making it, a piece of taffeta woven of polyester fiber yarns, a piece of non-woven fabric composed of the same fibers (filaments=3 deniers; density=110 g/m$^2$; thickness=120 microns) was employed. A composite membrane was made of this substrate in the same manner as in Example 20.

Using said membrane, tests were conducted of its separation performance with a 4% aqueous solution of methyl ethyl ketone and 4% aqueous solution of ethyl acetate, at temperature of 30° C. and under pressure of 60 Kg/cm$^2$. The results obtained are shown in Table 7.

TABLE 7

| Useful material | Rejection (%) | Water Flux (m$^3$/m$^2$ · day) |
|---|---|---|
| Methyl ethyl ketone | 98 | 0.21 |
| Ethyl acetate | 99.2 | 0.18 |

EXAMPLE 28

Using the non-woven fabric polysulfone substrate of Example 26, the composite membrane was made of this substrate in the same manner as in Example 25.

Membrane performance toward aniline was measured by using said membrane under the following conditions:

| Feed solution: | Water containing 1% aniline |
|---|---|
| Feed temperature: | 30° C. |
| Driving pressure: | 60 Kg/cm$^2$ |

The aniline rejection was 95% and the water flux was 0.11 m$^3$/m$^2$ day.

EXAMPLE 29

An aqueous solution containing 1 wt. pct. THEIC, 2 wt. pct. FA (THEIC/FA mole ratio=16/84), 2% by weight of sulfuric acid, 1 wt. pct. polyethylene glycol having a molecular weight of 400, and 20 wt. pct. isopropyl alcohol, was prepared; and was aged for 15 minutes at room temperature. Then, samples of composite membranes were made in the same manner as in Example 20, except that the heat treatment temperature was 160° C. in this instance, and its performance was evaluated.

That is, its selective separation performance was tested with 5-pct. and 10-pct. aqueous solutions of tetrahydrofuran, at temperature of 30° C. and under a pressure of 56 Kg/cm$^2$. The results obtained are shown in Table 8.

TABLE 8

| Concentration (%) | Rejection (%) | Water Flux (m$^3$/m$^2$ · day) |
|---|---|---|
| 5 | 99.8 | 0.28 |
| 10 | 99.1 | 0.13 |

EXAMPLE 30

Using the membrane of Example 20, tests were conducted with 1-pct., 5-pct. and 10-pct. aqueous solutions of ethylene glycol, at temperature of 30° C. and under pressure of 60 Kg/cm$^2$. The results obtained are shown in Table 9 below.

TABLE 9

| Concentration (%) | Rejection (%) | Water Flux (m$^3$/m$^2$ · day) |
|---|---|---|
| 1 | 95 | 0.52 |
| 5 | 94 | 0.21 |
| 10 | 88 | 0.08 |

EXAMPLE 31

Using the membrane of Example 26, membrane performance toward N,N-dimethyl acetamide(DMAc) was measured under the following conditions:

| Feed solution: | 5% aqueous solution of DMAc |
|---|---|
| Feed temperature: | 30° C. |
| Driving pressure: | 60 Kg/cm$^2$ |

The solute rejection was 99.6% and the water flux was 0.30 m$^3$/m$^2$.day.

EXAMPLE 32

Using the membrane of Example 20, a test was conducted of its selective separation performance with a mixed aqueous solution containing, as useful materials, 5% of acetic acid and 1% of methyl acetate, at a temperature of 25° C. and under a pressure of 70 Kg/cm². The results obtained are shown in Table 10 below.

TABLE 10

| Useful materials | Rejection (%) | Water Flux (m³/m² · day) |
|---|---|---|
| Acetic acid | 84 | |
| | | 0.43 |
| Methyl acetate | 84 | |

EXAMPLE 33

Using the membrane of Example 28, a test was made of its selective separation performance with boron(5 ppm) contained in 3.5% synthetic sea water at a temperature of 25° C. and under a pressure of 56 Kg/cm²; and a boron rejection rate of 88% was obtained.

EXAMPLE 34

Using the membrane Example 20, a test was made its selective separation performance with silver nitrate under the following conditions:

| | |
|---|---|
| Feed solution: | 0.5% aqueous solution of silver nitrate. |
| Feed temperature: | 30° C. |
| Driving pressure: | 50 Kg/cm² |

The silver ion rejection was 99.8% and the water flux was 0.63 m³/m².day.

EXAMPLE 35

Using the membrane of Example 27, tests were conducted of its selective separation performance with a 1% aqueous solution of cupric sulfate ($CuSO_4$) and a 1% aqueous solution of cobaltous nitrate($Co(NO_3)_2$), at temperature of 30° C. and under pressure of 50 Kg/cm². The results obtained are shown in Table 11 below.

TABLE 11

| Useful Metal Ion | Rejection (%) | Water Flux (m³/m² · day) |
|---|---|---|
| Cupric ion | 99.99 | 0.47 |
| Cobaltous ion | 99.99 | 0.42 |

EXAMPLE 36

Using the membrane of Example 26, a test was made of its selective separation performance with potassium ferrocyanide $K_4(FeCN)_6$ under the following conditions:

| | |
|---|---|
| Feed Solution: | 1% aqueous solution of potassium ferrocyanide. |
| Feed temperature: | 30° C. |
| Driving pressure: | 50 Kg/cm² |

The ferrocyanide ion rejection was 99.8% and the water flux was 0.96 m³/m².day.

EXAMPLE 37

Using the membrane of Example 27, a test was made of its selective separation performance with a mixed solution of 1% sodium chloride and 1% nickel chloride in water under the following conditions:

| | |
|---|---|
| Feed solution: | 1% aqueous solution of a mixed solution of 1% sodium chloride and 1% nickel chloride. |
| Feed temperature: | 30° C. |
| Driving pressure: | 50 Kg/cm² |

The nickel ion rejection was 99.9% and the water flux was 0.45 m³/m².day.

EXAMPLE 38

Using the membrane of Example 20, a test was conducted of its selective separation performance with a 1% aqueous solution of the mixture of sodium nitrite($NaNO_2$) and potassium nitrate ($KNO_3$) under the following conditions:

| | |
|---|---|
| Feed solution: | 1% aqueous solution of the mixture of sodium nitrite and potassium nitrate ($NaNO_2/KNO_3$ weight ratio = 60/40) |
| Feed temperature: | 30° C. |
| Driving pressure: | 60 Kg/cm² |

The solutes rejection was 99.5% and the water flux was 0.77 m³/m².day.

EXAMPLE 39

A coating solution containing 15 wt% of polysulfonate was cast directly on a glass plate of about 150 thickness at room temperature, and was immediately immersed in a water bath containing 20 wt % of DMF and 0.5 wt % of dodecylsodium sulfate at room temperature. After 5 minutes, a polysulfone substrate film (P.S.F.) floated off the glass plate. It was washed for an hour with pure water. A water solution containing 1 wt % of THEIC, 2 wt % of FA, 2 wt% of sulfuric acid, 1 wt % of polyethylene glycol(M.W.=20,000) and 20 wt % of isopropyl alcohol was prepared and matured 15 minutes at room temperature. A wet P.S.F. of 20 cm by 30 cm was dipped 5 minutes in this solution after which the P.S.F. was carried out and held one minute with the short dimension of the P.S.F. in a vertical position to drain excess coating solution. Then it was clamped between 2 cm iron strips (75 grams per strip) and was suspended in a convection oven with the long dimension in a horizontal position for 15 minutes at 150° C. Then it was soaked in a water solution containing 0.1 wt % of barium hydroxide for 15 minutes at room temperature. The membrane performance was 0.8 m³/m².day flux and 97.0% salt rejection under standard conditions.

EXAMPLE 40

A membrane was fabricated as in Example 22 except that a water solution containing 1 wt % of THEIC, 2 wt % of fufuryl alcohol (mole ratio: THEIC/FA=16/24), 2 wt % of sulfuric acid and 1 wt % of dodecyl sodium sulfate was used and cured 15 minutes at 150° C. The membrane performance was 0.5 m³/m² day flux and 99.9% salt rejection under standard conditions.

From the results of electron microphotographic studies, this membrane was found to possess a thin active layer between about 100 and 300 Angstroms in thickness on the surface of the polysulfone substrate.

The above membrane was evaluated under sea water conditions by changing the pressure and the feed temperature. The results appear in Table 12.

TABLE 12

| Operating pressure (kg/cm²) | Feed temp. (°C.) | Rejection (%) | Flux (m³/m² day) |
|---|---|---|---|
| 42 | | 99.8 | 0.14 |
| 56 | 25 | 99.9 | 0.31 |
| 70 | 25 | 99.9 | 0.50 |
| 70 | 35 | 99.9 | 0.61 |
| 70 | 45 | 99.8 | 0.95 |
| 70 | 25 | 99.8 | 0.55 |

Each run was operated one day and the feed rate was 1.85 m/sec.

EXAMPLE 41

26.1 grams (0.1 mole) of THEIC and 12.2 grams (1.5 mole) of a water solution containing 37 wt % of formalin was mixed and heated at 100° C. with complete dissolution. Thus, a formalin modified THEIC was obtained. A water solution containing 4 wt % of this formalin modified THEIC, 0.2 wt % of sulfuric acid, 0.7 wt % of dodecyl sodium sulfate and 20 wt % of isopropyl alcohol was prepared. The membrane was fabricated in the same way as in Example 2, except that the above solution was used. The flux was 0.1 m³/m² day and the salt rejection was 96.0% under standard conditions.

EXAMPLE 42

The FR-PS was fabricated as in Example 2 except for using a coating solution containing 14 wt % of polysulfone.

The membrane was fabricated as in Example 2 except that a coating solution containing 1 wt % of THEIC, 2 wt % of FA, 2 wt % of sulfuric acid and 0.7 wt % of dodecyl sodium sulfate was used and cured at 145° C. for 15 minutes, after which the membrane was treated 15 minutes in 1 N-sodium hydroxide at 95° C. The performance of the membrane obtained appears in Table 13. The feed solution was synthetic brackish water. The performance of a cellulose acetate membrane under the conditions of Experiment (b) was 0.65 m³/m² day flux and 93% salt rejection.

TABLE 13

| Exp. No. | Measuring condition (*1) feed solution | operating pressure (kg/cm²) | Performance Flux (m³/m² day) | Performance Rej. (%) | Membrane coefficient (*2) A × 10⁵ (g/cm · sec. atm.) | Membrane coefficient (*2) B × 10⁵ (cm/sec.) | A³/B × 10¹⁰ |
|---|---|---|---|---|---|---|---|
| a | | 10 | 1.00 | 96.2 | 15.0 | 4.57 | 739 |
| b | | 20 | 2.20 | 97.6 | 14.6 | 6.26 | 497 |
| c | NaCl | 30 | 3.49 | 98.0 | 14.9 | 8.24 | 401 |
| d | 0.25% | 40 | 4.90 | 97.2 | 15.4 | 16.3 | 224 |
| e | MgCl₂.6H₂O | 10 | 0.71 | 93.5 | 10.5 | 5.62 | 206 |
| f | 0.58% | 20 | 1.53 | 96.0 | 10.2 | 7.39 | 144 |

(*1) = at 25° C.
(*2) = These coefficients A and B are calculated according to the reference; H. K. Landol, Desalination 13 (1973) pp. 312-332.

We claim:

1. A method for selective separation of at least one water-soluble useful material from an aqueous solution by reverse osmosis comprising contacting the aqueous solution under pressure maintained above the osmotic pressure of said aqueous solution with a semipermeable composite membrane, wherein said semipermeable composite membrane comprises a porous substrate, and a barrier layer about 0.01 to about 0.1 micron in thickness and composed of a cross-linked polymeric material having isocyanurate structures of Formula (I) formed on said porous substrate:

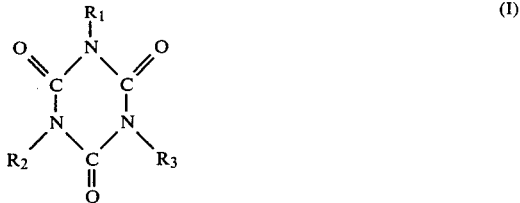

wherein each of $R_1$, $R_2$ and $R_3$ is selected from the group consisting of hydrogen, a glycidyl group, an alkyl radical containing from 2 to 5 carbon atoms, an alkyl radical carrying a functional hydroxyl group and an alkyl radical carrying a functional glycidyl group, with the proviso that at least two of $R_1$, $R_2$ and $R_3$ are selected from the group consisting of glycidyl groups, alkyl groups carrying a functional hydroxyl group and alkyl groups carrying functional glycidyl groups;

said cross-linked polymeric material having linkages selected from the group consisting of ether (—O—) linkages, ester

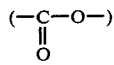

linkages or a combination thereof connecting said isocyanurate structures to each other.

2. A method according to claim 1, wherein at least two of $R_1$, $R_2$ and $R_3$ in the Formula (I) are selected from the group consisting of a functional glycidyl group and a R group specified by the following Formula (II):

$$R = -A - X + B - X)_{\overline{n}} R'$$  (II)

Wherein A represents an alkylene radical containing from 2 to 5 carbon atoms;

B represents an alkylene radical containing from 1 to 17 carbon atoms;

X represents ether(—O—) or ester

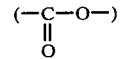

linkages;

propyl alcohol, cyclohexanol, ethylene glycol, glycerin, sorbitol and cyclohexane diol; the carboxylic acid is selected from the group consisting of formic acid, acetic acid, propionic acid, butyric acid, benzoic acid, toluic acid, oxalic acid, malonic acid, phthalic acid, and trimellitic acid; the aldehyde is selected from the group consisting of acetaldehyde, propionaldehyde, furfural and benzaldehyde; the ketone is selected from the group consisting of acetone, methyl ethyl ketone, cyclohexanone and acetophenone; the ether is selected from the group consisting of diethyl ether, anisole, tetrahydrofuran, tetrahydropyrane, dioxane, and styrene oxide; the ester is selected from the group consisting of methyl acetate, ethyl acetate, methyl benzoate, and methyl acrylate; the amine is selected from the group consisting of ethyl amine, benzyl amine, aniline, toluidine, piperidine, piperazine, dimethyl amine, triethyl amine, and pyridine; the amide is selected from the group consisting of formamide, acetamide, N,N-dimethyl acetamide, urea and ε-caprolactam; the phenol is selected from the group consisting of phenol, cresol, resorcinol, hydroquinone, aminophenol, and pyrogallol; the hydroxy acid is selected from the group consisting of lactic acid, malic acid, tartaric acid, and citric acid; the aprotic-polar solvent is selected from the group consisting of dimethyl sulfoxide, N,N-dimethylformamide, N,N-dimethylacetamide and N-methylpyrolidone.

23. A method according to claim 20, wherein the transition metal compounds are selected from the group consisting of Ni, Co, Fe, Cr, U, Ag, Au, Cu, Mo, W, Hg and Pt compounds which form ions or complex ions.

24. A method according to claim 20, wherein the water-soluble useful material is selected from the group consisting of ethylene glycol, acetic acid, tetrahydrofuran, ethyl alcohol, phenol, ε-caprolactam, dimethylformamide, ethyl alcohol, ethyl acetate, methyl ethyl ketone, aniline, N,N-dimethyl acetamide, dimethylsulfoxide, cobalt ion, cupric ion, silver ion and nickel ion.

25. A method according to claim 20, wherein the concentration of the water-soluble useful material contained in the aqueous solution is within the range of about 0.01 to about 20% by weight.

26. A method according to claim 25, wherein the concentration of the water-soluble useful material contained in the aqueous solution is within the range of about 0.1 to about 10% by weight.

27. A method according to claim 20, wherein the kinds of water-soluble useful material in the aqueous solution are at least two.

28. A method according to claim 20, wherein the aqueous solution is brackish water or sea water containing water-soluble useful materials.

\* \* \* \* \* n represents zero or an integer when n is more than 1, B may be the same or different;

R' is selected from the group consisting of hydrogen, an alkyl radical containing from 2 to 5 carbon atoms and the above R group represented by the Formula (II).

3. A method according to claim 1, wherein the cross-linked polymeric material is a reaction product of at least one compound selected from the group consisting of 1,3,5-tris(hydroxyethyl) isocyanuric acid, bis(2-hydroxypropyl) isocyanuric acid, 1,3,5-tris(glycidyl) isocyanuric acid, and mixtures thereof.

4. A method according to claim 1, wherein the cross-linked polymeric material is selected from the group consisting of water-soluble intermolecular condensation reaction products of an organic compound having the isocyanurate structure of Formula (I), addition reaction products of an organic compound having isocyanurate structure of Formula (I) and mixtures thereof.

5. A method according to claim 4, wherein the cross-linked polymeric material is selected from the group consisting of an intermolecular condensation reaction product of 1,3,5-tris (hydroxyethyl) isocyanuric acid with formaldehyde and an addition reaction product of 1,3,5-tris(gylcidyl) isocyanuric acid with ethylene glycol.

6. A method according to claim 4, wherein said cross-linked polymeric material is selected from the group consisting of a reaction product of an organic compound having isocyanurate structure of Formula (I) with at least one compound selected from the group consisting of an epoxy compound containing from 2 to 5 carbon atoms, polyethylene oxide, multivalent alcohol containing from 2 to 8 carbon atoms, multivalent carboxylic acid containing from 2 to 17 carbon atoms, multivalent hydroxy acid containing from 2 to 17 carbon atoms, formaldehyde, and mixtures thereof.

7. A method according to claim 1, wherein the cross-linked polymeric material is a cross-linked intermolecular reaction product of an organic compound having isocyanurate structure of Formula (I) with at least one water-soluble comonomer selected from the group consisting of furfuryl alcohol, tetrahydrofurfuryl alcohol, an epoxy compound containing from 2 to 5 carbon atoms, polyethylene oxide, multivalent alcohol containing from 2 to 8 carbon atoms, multivalent carboxylic acid containing from 2 to 17 carbon atoms, multivalent hydroxy acid containing from 2 to 17 carbon atoms, formaldehyde, and mixtures thereof.

8. A method according to claim 7, wherein said cross-linked intermolecular reaction product is a reaction product of an organic compound having isocyanurate structure of Formula (I) with an alcohol selected from the group consisting of furfuryl alcohol, multivalent alcohol containing from 2 to 8 carbon atoms or a mixture thereof.

9. A method according to claim 7, wherein said cross-linked polymeric material is an intermolecular reaction product of 1,3,5-tris (hydroxyethyl) isocyanuric acid with furfuryl alcohol.

10. A method according to claim 7, wherein the cross-linked intermolecular reaction product is a reaction product of about 20 to 80% by weight of the organic compound having isocyanurate structure of Formula (I) with about 80 to 20% by weight of the water-soluble comonomer.

11. A method according to claim 6, 7 or 8, wherein the epoxy compound is selected from the group consisting of ethylene oxide, propylene oxide or a mixture thereof; the multivalent alcohol is selected from the group consisting of ethylene glycol, glycerine, sorbitol, inositol and mixtures thereof; the multivalent carboxylic acid is selected from the group consisting of oxalic acid, succinic acid, maleic acid, fumaric acid, 1,2,3,4-butane tetracarboxylic acid and mixtures thereof; the multivalent hydroxy acid is selected from the group consisting of glycolic acid, malic acid, tartaric acid, citric acid, salicylic acid and mixtures thereof.

12. A method according to claim 1, wherein said porous substrate is microporous, about 30 to about 1,000 microns in thickness and the semipermeable barrier layer is about 150 to about 1,000 angstroms in thickness.

13. A method according to claim 12, wherein the porous substrate is about 100 to 300 microns in thickness and the semipermeable barrier layer is about 100 to 500 angstroms in thickness.

14. A method according to claim 1, wherein the porous substrate is reinforced or piled on to a material selected from the group consisting of a calendered fabrics, uncalendered fabrics, non-woven fabrics, porous film and paper.

15. A method according to claim 1, wherein the porous substrate is a porous film comprising a member selected from the group consisting of polysulfone and polyvinyl chloride.

16. A method according to claim 1, wherein the surface of the barrier layer is protected with a water-insoluble protective layer comprising a member selected from the group consisting of polyvinyl alcohol, partially saponified polyvinyl acetate or a mixture thereof.

17. A method according to claim 16, wherein the thickness of said water-soluble protective layer is within the range of about 0.1 to 10 microns.

18. A method according to claim 17, wherein the thickness of said water-soluble protective layer is within the range of about 0.5 to about 2 microns.

19. A method according to claim 16, wherein the average degree of polymerization of polyvinyl alcohol or partially saponified polyvinyl acetate is from about 100 to 3,000, and the degree of saponification of the partially saponified polyvinyl acetate is at least 0.70.

20. A method according to claim 1, wherein the water-soluble useful material is at least one compound selected from the group consisting of hydrocarbons, their derivatives, boric compounds and transition metal compounds, said derivatives having at least one element of oxygen, sulfur and nitrogen, wherein the total number of atoms of carbon, hydrogen, oxygen, sulfur and nitrogen of said derivatives is within the range of 7 to 30.

21. A method according to claim 20, wherein the water-soluble useful hydrocarbon or their derivative is at least one compound selected from the group consisting of aliphatic alcohol having 1 to 8 carbon atoms, carboxylic acid having 2 to 8 carbon atoms, aldehyde having 2 to 8 carbon atoms, ketone having 3 to 8 carbon atoms, phenol having 6 to 13 carbon atoms, amide having 1 to 8 carbon atoms, ester having 2 to 10 carbon atoms, ether having 2 to 10 carbon atoms, hydroxy acid having 3 to 7 carbon atoms, amine having 2 to 10 carbon atoms, and aprotic-polar solvents having 2 to 6 carbon atoms other than the above mentioned compounds.

22. A method according to claim 21, wherein the aliphatic alcohol is at least one compound selected from the group consisting of methyl alcohol, ethyl alcohol,

UNITED STATES PATENT AND TRADEMARK OFFICE
CERTIFICATE OF CORRECTION

PATENT NO. : 4,366,062
DATED : December 28, 1982
INVENTOR(S) : Kurihara et al

It is certified that error appears in the above-identified patent and that said Letters Patent is hereby corrected as shown below:

Column 9, line 1, delete "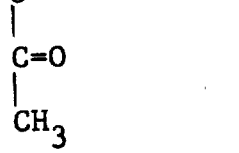 " and substitute -- 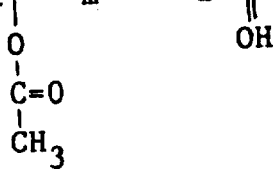 --.

Column 11, line 2, delete "propinaldehyde" and substitute --propionaldehyde--.

Column 22, lines 33-34, delete "polysulfonate was cast" and substitute --polysulfone was cast--.

Signed and Sealed this

Fourth Day of October 1983

[SEAL]

Attest:

GERALD J. MOSSINGHOFF

Attesting Officer        Commissioner of Patents and Trademarks